UNITED STATES PATENT OFFICE.

SAMUEL S. RUSTON, WILLIAM E. HOPKINS, AND BENJAMIN RUSTON, OF SYRACUSE, NEW YORK, ASSIGNORS TO THE ADAMANT MANUFACTURING COMPANY, OF SAME PLACE.

PROCESS OF MANUFACTURING PLASTERING COMPOUNDS.

SPECIFICATION forming part of Letters Patent No. 433,743, dated August 5, 1890.

Application filed October 26, 1889. Serial No. 328,329. (No specimens.)

*To all whom it may concern:*

Be it known that we, SAMUEL S. RUSTON, WILLIAM E. HOPKINS, and BENJAMIN RUSTON, citizens of the United States, residing at Syracuse, in the county of Onondago and State of New York, have invented a new and useful Improvement in the Process of Manufacturing Plastering Compounds, of which the following is a specification.

This invention relates to the manufacture of that class of compositions for plastering walls and other analogous uses in which a restraining substance is employed, whereby the setting of the composition is retarded.

The object of this invention is to produce a composition of this character in pulverulent form in a simple and expeditious manner.

In practicing our invention we dissolve glue, glue-stock, or other glutinous or gelatinous substance in water, and add to about eight pounds of this solution about sixteen pounds of oil, fat, or any other suitable hydrocarbon compound. These ingredients are mixed thoroughly, and the mixture is heated to about 200° Fahrenheit. A suitable hardening-acid is added slowly to the mixture while it is being stirred. We prefer to add about twenty-two pounds of muriatic acid and about five pounds of sulphuric acid. The mixture is then heated to about 400° Fahrenheit and stirred, in order to thoroughly commingle the ingredients. The mixture may be allowed to cool, which usually occupies several days, or it may be used hot. We dissolve about one pound of this mixture in from fifteen to twenty pounds of water, and introduce a suitable quantity of this solution into a retort or vessel which is provided with a revolving or other suitable stirrer and with steam-pipes or some other suitable heating appliance. We then introduce into this solution powdered or comminuted mineral or vegetable matter—such as plaster-of-paris, lime, marble-dust, saw-dust, or a compound composed of such ingredients—and stir the mixture constantly and thoroughly under constant application of heat. The mixing-retort is preferably closed tightly after the dry material has been introduced, whereby the vapors generated by the heating of the mixture create a pressure in the retort. The liquid solution is all absorbed by the dry absorbent substance, and combines therewith in such manner that the resultant material is a pulverulent substance having the appearance of a fine dry powder, especially when plaster-of-paris, lime, or marble-dust is used. Upon relieving the pressure in the retort, preparatory to discharging the material therefrom, the compressed steam or vapor which is contained in the material expands and disintegrates the material, which aids materially in imparting to the material the desired fine pulverulent condition. This dry pulverulent substance is then discharged from the retort and bolted for the purpose of separating from the bulk of the material, which consists of fine powder, any small lumps or aggregations which may have been formed, but which in any event form only a small percentage of the product. These lumps or coarse tailings which are discharged from the bolt are then ground to powder and mixed with the pulverulent material which has been bolted out.

We are aware that it is not new to sift the absorbent material into the solution while the latter is at rest in a shallow pan. This mode of procedure produces a cake of doughy consistency, which must be removed from the pan and dried, and which requires considerable time in drying and produces a friable but not a pulverulent product.

Our improved method of manufacture produces the bulk of the product at once in the form of a dry fine powder and effects a large saving in time and in cost of production and permits the incorporation of a much larger proportion of dry material with the solution.

We claim as our invention—

1. The herein-described method of producing a dry pulverulent restraining and hardening compound suitable for use in plastering compositions, which consists in dissolving the restraining substance in water and then mixing a dry absorbent comminuted material with the solution by stirring under the application of heat until the mixture is converted into a dry pulverulent substance, substantially as set forth.

2. The herein-described method of producing a dry pulverulent restraining compound, which consists in dissolving the restraining substance in water and then mixing a dry absorbent material with the solution in a closed vessel by stirring under the application of heat and pressure until the mixture is converted into a dry pulverulent substance, substantially as set forth.

Witness our hands this 7th day of October, 1889.

SAMUEL S. RUSTON.
    WILLIAM E. HOPKINS.
    BENJAMIN RUSTON.

Witnesses to signatures of Samuel S. Ruston and William E. Hopkins:
    J. H. SMITH,
    THEO. L. POPP.

Witnesses to signature of Benjamin Ruston:
    H. T. KELLY,
    JAMES J. WARREN.